Patented Mar. 18, 1952

2,589,674

UNITED STATES PATENT OFFICE 2,589,674

ALIPHATIC AMIDO PROPYL QUATERNARY AMMONIUM SALTS

Elmer W. Cook, New York, N. Y., and Philip H. Moss, Stamford, Conn., assignors to American Cyanamid Company, New York, N. Y., a corporation of Maine No Drawing. Application May 24, 1947, Serial No. 750,366

5 Claims. (Cl. 260—404.5)

The present invention relates to the production of new organic ammonium compounds, and relates more particularly to quaternary ammonium compounds which are suitable for various uses such as wetting agents, detergents, emulsifying agents, germicides, fungicides and the like.

The compounds of the invention are defined by the general formula

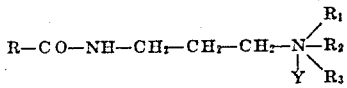

wherein R is a member of the group consisting of aliphatic and alicyclic radicals containing at least 7 carbon atoms such as nonyl, undecyl, tridecyl, heptadecyl, the residue of abietic acid, and the like radicals; $R_1$ and $R_2$ are members of the group consisting of alkyl and hydroxyalkyl radicals of 1–3 carbon atoms such as, for example, methyl, ethyl, propyl, isopropyl, hydroxyethyl, dihydroxypropyl, and the like radicals; $R_3$ is a hydroxyalkyl radical of 1–3 carbon atoms such as, for example, hydroxyethyl, hydroxypropyl, dihydroxypropyl and the like; and Y is an anion such as, for example, halogen, hydrogen sulfate, thiocyanate, etc.

The new compounds are for the most part thick liquids or amorphous solids having no definite melting points and which are readily soluble in water and form stable aqueous solutions. The compounds are also readily soluble in the ordinary organic solvents such as ethanol, acetone, ether, toluene, and the like. Because of their excellent dispersing properties, they exert a remarkable action as wetting and emulsifying agents, and also have been found to be particularly suitable for rewetting uses and as assistants in stripping vat dyes from cellulosic textile materials.

As noted above, R may be any aliphatic or alicyclic radical containing a sufficient number of carbon atoms to provide a hydrophobic radical which will produce orientation of the compounds at an oil-water interface. It is an advantage of the invention that a wide variety of monocarboxylic acids may be used for this purpose such, for example, as caproic acid, decenoic acid, lauric acid, myristic acid, palmitic acid, stearic acid, arachidic acid, oleic acid and other more highly unsaturated fatty acids of 14–18 carbon atoms obtained from vegetable and animal oil and fats such as soya bean oil, cottonseed oil, coconut oil, linseed oil, castor oil, dehydrated castor oil and the like, or from other commercial sources such as tall-oil. Alicyclic monocarboxylic acids which may be used include petroleum naphthenic acids of 7–14 carbon atoms having boiling points within the range of 215°–310° C., as described in Ellis, "Chemistry of Petroleum Derivatives," (1934) edition) pages 1062–1085, abietic acid, and the like.

It will be apparent that the number of carbon atoms contained by the aliphatic or alicyclic radicals is largely dependent on the purpose to which the quaternarized compound is to be put. Thus, for some purposes it may be desirable that R may contain in excess of 20 carbon atoms although for most wetting, emulsifying, and the like uses we have found that it is more desirable that R shall contain not more than about 20 carbon atoms and, preferably, for the most ready dispersibility in aqueous media, shall not contain more than 19 carbon atoms.

Representative compounds which fall within the scope of this invention are:

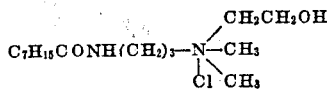

Caprylamidopropyldimethyl-beta'-hydroxyethyl ammonium chloride

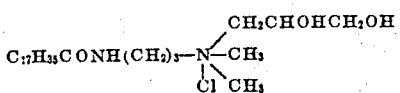

Gamma-stearamidopropyl-dimethyl-dihydroxypropyl ammonium chloride

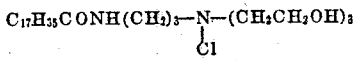

Gamma-stearamidopropyl-tris (beta'-hydroxyethyl) ammonium chloride

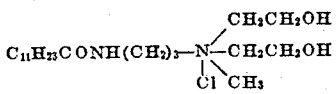

Lauramidopropylmethyl-bis (beta'-hydroxyethyl) ammonium chloride

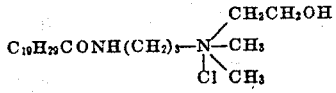

Abietamidopropyldimethyl-beta'-hydroxyethyl ammonium chloride

The present invention is a continuation-in-part of application Serial Number 521,588 of Elmer W Cook and Philip H. Moss, filed February 8, 1944 now Patent No. 2,459,062, issued January 11, 1949 The preferred method of preparing the nove quaternary ammonium salts of this inventio1 is described in that application and may be ex ressed by the following equations and description:

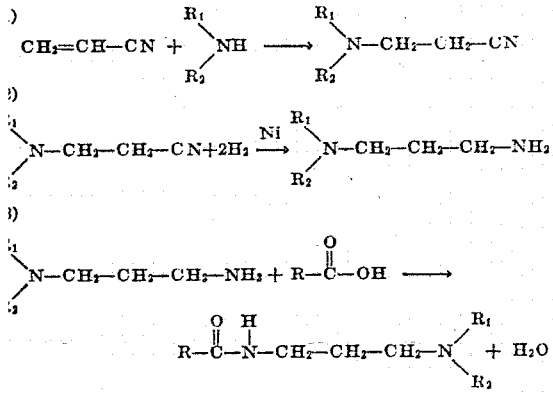

where $R_1$ and $R_2$ are as defined above.

4) The novel quaternary ammonium salts of the invention may be prepared from the amidopropyl amines whose preparation is outlined above by reaction thereof with the desired alkylating agent such as an alkyl halide, a halohydrin or ethylene oxide in the presence of a suitable acidic agent, or by other suitable methods.

The invention is further illustrated by the following examples:

Example 1

To 126 gm. (2.4 mols) of acrylonitrile was added slowly 250 gm. (2.4 mols) of diethanolamine. After the addition was completed and the exothermic reaction had ceased, the solution was heated for 2.4 hours on a steam bath. After vacuum stripping of the product at 100° C., 356 gm. of beta-di-(hydroxyethyl) aminopropionitrile was obtained.

350 gm. of this aminonitrile was hydrogenated at 2000 p. s. i. at 115° C. in the presence of about 10 gm. of Raney nickel and 4.4 mols of anhydrous ammonia. The product was vacuum distilled, yielding 275 gm. (76%) of gamma-di-(beta'-hydroxyethyl) aminopropylamine, having a boiling point of 175°–187° C. at 8.6 mm.

56.8 gm. stearic acid and 33 gm. of the above described aminopropylamine was dissolved in about 50 gm. of toluene. The acylation reaction was carried out under reflux conditions at 155°–161° C. for a period of 9 hours. Thereafter the toluene and water of reaction was removed by vacuum distillation leaving 88 gm. of gamma-stearamidopropyl - di - (beta'-hydroxyethyl) amine, a tan, brittle solid at room temperature.

105 gm. (0.245 mol) of the above described amidopropylamine was dissolved in 225 cc. of ethanol. To this solution was added 22.4 cc. of concentrated hydrochloric acid. The solution was heated to 62° C., and 16 gm. ethylene oxide was passed into the heated solution. After a reaction period of four hours at 70° C. the solvent was removed by distillation. The product was stiff, dark, and partially opaque at 100° C., and was a hard opaque solid at room temperature. The quaternary ammonium salt was completely soluble in warm water and the ordinary organic solvents. This compound was found to possess particularly desirable characteristics as an assistant for stripping vat dyes from cellulosic textile materials and also as a rewetting agent.

Example 2

Into 545 gm. of a 25% aqueous solution of dimethyl amine, cooled with ice and water, there were added from a dropping funnel 170 gm. of acrylonitrile. The rate of addition of the nitrile was controlled so that the temperature in the reaction vessel remained below 20° C. After the cold reaction mixture had stood for one hour, it was poured into 350 cc. of 10% aqueous sodium hydroxide solution, the oily layer collected and the aqueous layer extracted with ether. The extract and the oily layer were dried over sodium sulfate and distilled. 218 gm. of beta-dimethylaminopropionitrile were collected at 73°–74° C./22 mm.

207 gm. of beta-dimethylaminopropionitrile were hydrogenated in an autoclave under a pressure of about 90 atmospheres at 100° C. in the presence of 72.4 gm. of anhydrous ammonia, using Raney nickel as the catalyst. The product was dried over solid potassium hydroxide and vacuum distilled. 204.5 gm. of gamma-dimethylaminopropylamine were collected, B. P. 134° C. at atmospheric pressure.

38 gm. of myristyl chloride were added dropwise to a solution of 15.5 gm. of gamma-dimethylaminopropylamine in 160 gm. of benzene. After one hour of stirring, the benzene solution was washed with 10% aqueous sodium hydroxide. The benzene layer was then washed once with water and the solvent removed by vacuum distillation. The residue was distilled at 208°–215° C./1–2 mm., giving a solid distillate of gamma-myristamidopropyldimethylamine.

266 gm. (0.852 mol) of gamma-myristamidopropyldimethylamine was dissolved in 450 gm. of ethyl alcohol to which was added 90.5 cc. (1.1 mol) of concentrated hydrochloric acid. 40 gm. (0.9) mol) of ethylene oxide were passed into the solution and the reaction was continued at a temperature of 80° C. for 3 hours. The solvent was then removed by distillation under reduced pressure. The product was gamma-myristamidopropyldimethyl - beta'-hydroxyethyl ammonium chloride, a light brown amorphous solid, soluble in warm water, alcohol, toluene, ether, etc.

Example 3

250 gm. (1.1 mol) of caprylamidopropyldimethylamine, prepared in a manner similar to that of preparing the amidoamine of Example 1, was dissolved in 450 gm. of ethanol and to this solution was added 90.5 cc. (1.1 mol) of concentrated hydrochloric acid. The hydrochloride in ethanol solution was reacted with 53 gm. (1.2 mol) of ethylene oxide at a temperature of 50° C. for a period of 3 hours. The solvent was thereafter removed under reduced pressure. A yield of about 340 gm. of gamma-caprylamidopropyldimethyl-beta'-hydroxyethyl ammonium chloride was obtained. The product was a brown, waxy solid which was readily soluble in warm water.

Example 4

7.4 gm. (0.02 mol) of beta'-myristamidoethyldimethylamine was dissolved in ethanol in a flask equipped with an air condenser. The solution was heated with 2 gm. (0.025 mol) of ethylene chlorhydrin at a temperature of 130°–140° C. for 3 hours. The product, beta-myristamidoethyldimethyl - beta' - hydroxyethylammonium chloride was a soft, water soluble solid at room temperature.

Example 5

221 gm. (0.73 mol) of wood rosin acid and 100 gm. (0.98 mol) of gamma-dimethylaminopropylamine was heated over a metal bath at a temperature of 200°–215° C. and the water of reaction was removed with a benzene carrier.

93 gm. (0.24 mol) of the so-produced gamma-abietamidopropyldimethylamine was dissolved in an equal weight of alcohol and to this solution was added 20 cc. (0.24 mol) of hydrochloric acid. About 12 gm. (0.27 mol) of ethylene oxide was passed into the solution. The mixture was allowed to stand overnight at a temperature of about 46° C. The product, gamma-abietamidopropyldimethyl - beta'-hydroxyethyl ammonium chloride, was a tan solid, soluble in alcohol, acetone, ether, and quite soluble in warm water.

Example 6

206 gm. of gamma-stearamidopropyldimethylamine was dissolved in 300 gm. of ethanol. To this solution was added a slight excess of concentrated hydrochloric acid, such that the final pH of the solution was 3.9. The solution was heated to 40°–45° C. and an equivalent weight of ethylene oxide was passed into it. The reaction product, gamma - stearamidopropyldimethylhydroxyethylammonium chloride, was a tan solid which was readily soluble in water.

Example 7

468 gm. of gamma-lauramidopropyldimethylamine and 133 gm. of ethylene chlorhydrin was heated at 125° C. for 2 hours, the reaction mixture being stirred during the mild exothermic reaction. The product gamma-lauramidopropyldimethylhydroxyethylammonium chloride, was a brown, opaque, brittle solid which was readily soluble in water.

Example 8

A mixture of 117 gm. of gamma-stearamidopropyldimethylamine and 35 gm. of alpha-glycerolchlorhydrin was stirred and heated at 125° C. for 1.5 hours. The quaternary ammonium salt, gamma - stearamidopropyldimethyl - beta',gamma'-dihydroxypropyl ammonium chloride, was a tan opaque solid which was water soluble in fairly high concentrations.

What we claim is:

1. A quaternary ammonium compound having the general formula

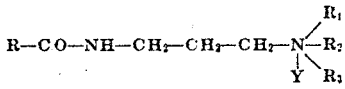

wherein R is a member of the group consisting of aliphatic and alicyclic radicals containing at least 7 carbon atoms, $R_1$ and $R_2$ are members of the group consisting of alkyl and hydroxyalkyl radicals of 1–3 carbon atoms, $R_3$ is a hydroxyalkyl radical of 1–3 carbon atoms, and Y is an anion.

2. A compound as in claim 1, in which Y is halogen.

3. Stearamidopropyldimethyl - beta - hydroxyethyl ammonium chloride.

4. Stearamidopropyldimethyl-dihydroxypropyl ammonium chloride.

5. Stearamidopropyl - tris(beta-hydroxyethyl) ammonium chloride.

ELMER W. COOK.
PHILIP H. MOSS.

REFERENCES CITED

The following references are of record in the file of this patent:

UNITED STATES PATENTS

| Number | Name | Date |
|---|---|---|
| 1,737,458 | Hartmann et al. | Nov. 26, 1929 |
| 1,860,563 | Wayne | May 31, 1932 |
| 2,085,706 | Schoeller | June 29, 1937 |
| 2,329,406 | Mauersberger | Sept. 14, 1943 |
| 2,345,570 | Bley | Apr. 4, 1944 |
| 2,362,760 | Maxwell | Nov. 14, 1944 |
| 2,459,062 | Cook et al. | Jan. 11, 1949 |

OTHER REFERENCES

Organic Chemistry by Karrer, 1946 ed., page 122.